June 23, 1931.  M. HEINE  1,811,546
TRAFFIC REGULATING SIGN
Filed Aug. 14, 1928  5 Sheets-Sheet 1

Inventor
Martin Heine
by Knight Bro
attorneys

Fig.3 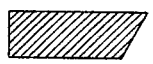 Fig.4  Fig.5  Fig.6  Fig.7 
Fig.8  Fig.9  Fig.10 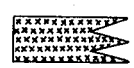 Fig.11 Fig.12 Fig.13  
Fig.14  Fig.15  Fig.16 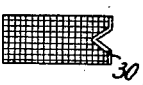 Fig.17  Fig.18 
Fig.19  Fig.20  Fig.21 
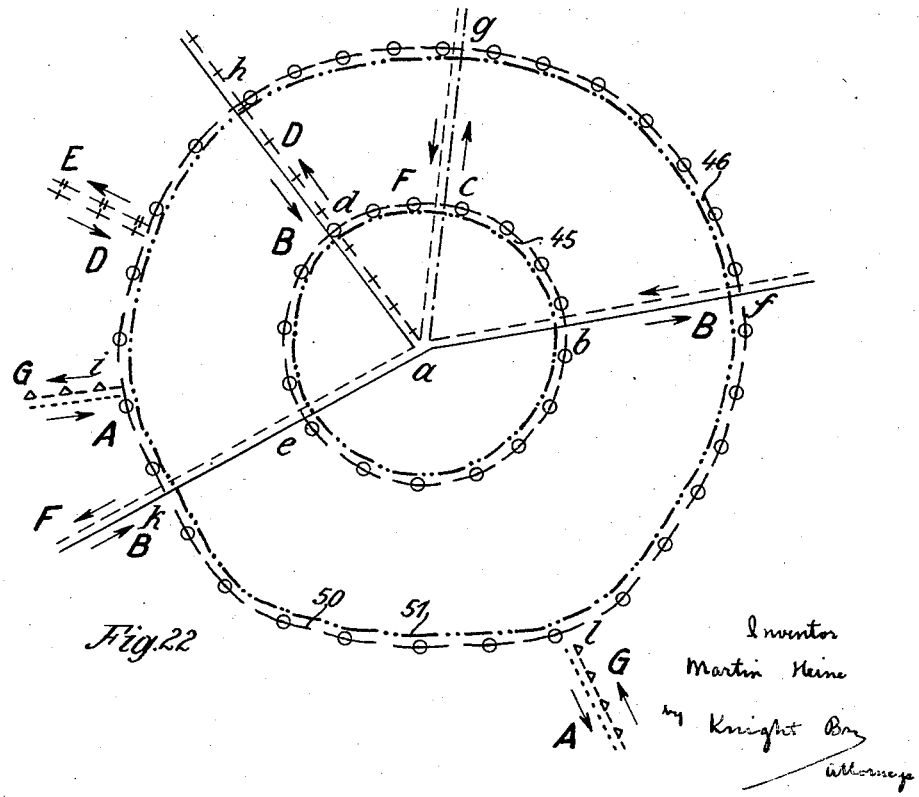
Fig.22

June 23, 1931.  M. HEINE  1,811,546
TRAFFIC REGULATING SIGN
Filed Aug. 14, 1928  5 Sheets-Sheet 3

Inventor
Martin Heine
by Knight Bro
Attorneys

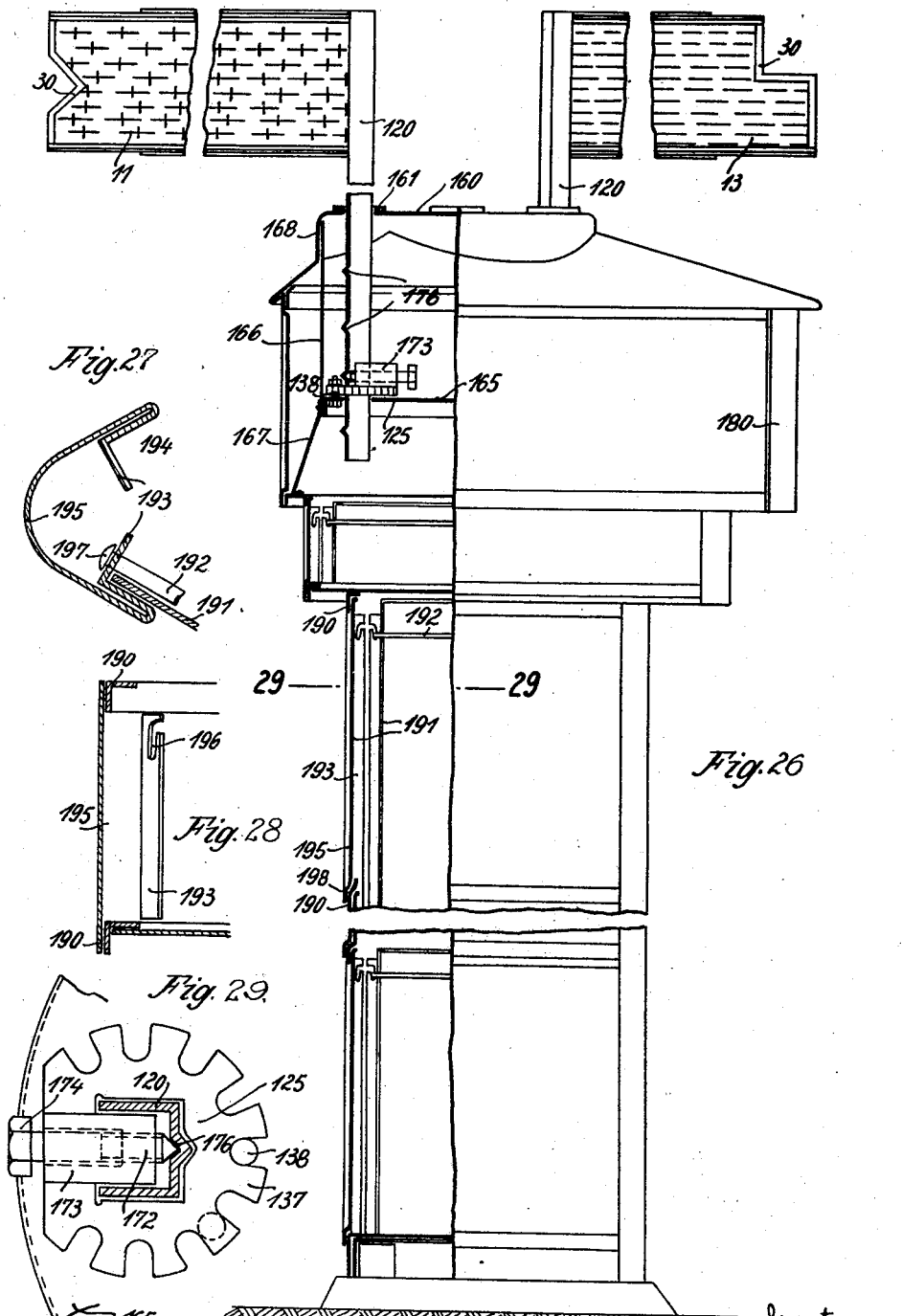

Patented June 23, 1931

1,811,546

UNITED STATES PATENT OFFICE

MARTIN HEINE, OF SCHWELM/WESTFALEN, GERMANY

TRAFFIC REGULATING SIGN

Application filed August 14, 1928, Serial No. 299,549, and in Germany January 29, 1927.

My invention relates to traffic regulating signs for highways and has for its object to provide an improved construction and arrangement of parts in devices of this character for adapting said devices to be used separately or in conjunction with suitably marked maps.

More specifically the present invention contemplates an improved construction for devices of this character to enable any person such, for example, as an automobilist travelling at high speed, to read the road signs without the necessity of taking note of the contents of the statements contained thereon, said signs being readable at a glance by the provision of indicators having special shape, configuration, color, combined with the direction and arrangement of arrows.

A further object of the invention is the suitable constructive design of the road indicators and finger posts, which enables the indicators, finger posts or signs to be produced in mass manufacture in an inexpensive manner and which permits of their erection in the shortest time possible and by simple means, the signs being to a high extent safeguarded against unauthorized interference and at the same time easily mountable upon the pillars or posts according to the conditions prevailing at the time.

The invention relates, furthermore, to the effective utilization of the traffic indicators or their pillars or posts for advertising purposes, provisions being made for the easy and rapid exchange of the advertising signs. Finally the invention relates to means, which enable the traffic directing pillars or posts to be erected at any desired places or points, for instance close to the corners of houses, building blocks, walls and the like.

The road indicators according to the invention, which are preferably destined for use in conjunction with a map are provided with pointers or vanes, which carry the sign that is apportioned to the road terminus located in the direction in which they point, in such a manner, that sign posts on roads leading towards the road terminus in the direction towards the road terminus carry uniformly the signs coordinated to this road terminus, and in the opposite direction those signs, which are apportioned to those road termini at which the finger post points in the other direction. Signs apportioned to the road terminus may have certain colors, geometrical signs or combinations of both or colored surfaces with differently colored inscriptions.

To enable the statements of the road indicating signs and their meaning to be read in an extraordinary short space of time colors apportioned to the road termini are according to the invention made use of. On the finger post a plurality of signs of different nature may be apportioned to the road termini, and if desired also on the map. In a preferred design according to the invention signs of a certain color may have signs of a certain form apportioned thereto.

In the design of the road indicator pillars according to the invention there are on one pillar or post pointers mounted in common with their ends facing the post at a distance from the post or its axis and above the post, in such a manner, that the space above the post and between the ends of the points offers an unrestricted view. Preferably the signs are arranged in vertical steps, so that it is effectively avoided, that the individual signs of a traffic directing pillar overlap, and the individual sign boards become distinctly visible in their characteristic shape, as soon as the line of sight of the driver or observer is oblique to the longitudinal direction of the sign even under a very slight angle. According to a further development of the invention the visibility of the individual signs may be increased by broadening the pointers or vanes at their ends facing the post or in the vicinity of it, which increases the visibility of the contour of the pointer and which may give a clear view of the signs characteristic for the post.

According to a further constructive development of the indicator pillars according to the invention, the arrows carrying the sign boards, preferably constructed as section girders, are each per se rotatable around their longitudinal axis and vertically adjustable.

The invention covers all these features and modifications.

In the drawings affixed hereto and forming part of the specification the invention is illustrated as embodied in a number of constructions, partly by perspective views, partly by diagrams.

In the drawings

Figures 3 to 21 inclusive are diagrammatic plan views of road-indicating pointers of various forms and color markings.

Fig. 22 another example of a map.

Figure 23:
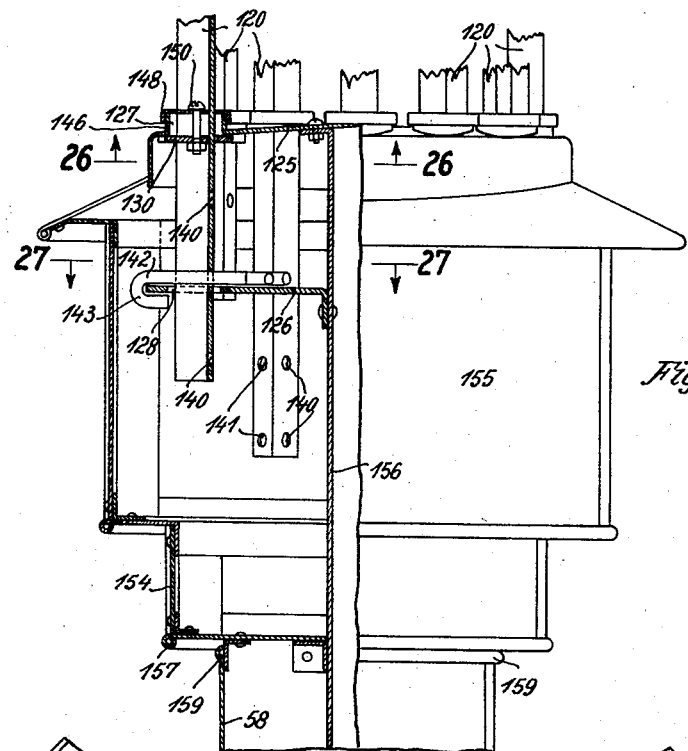

Fig. 23 a sectional elevation of the head of a traffic pillar.

Figures 24, 25:
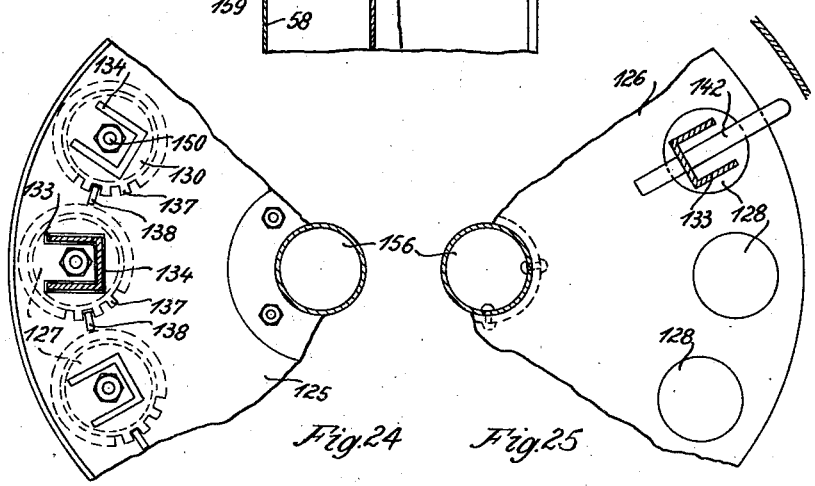

Figs. 24 and 25 details of the road indicator head in plan along section lines 26—26, 27—27 of Fig. 23.

Fig. 26 another example of a road indicator pillar in sectional side elevation.

Figs. 27 to 29 details of the arrangement according to Fig. 26.

Figure 30:
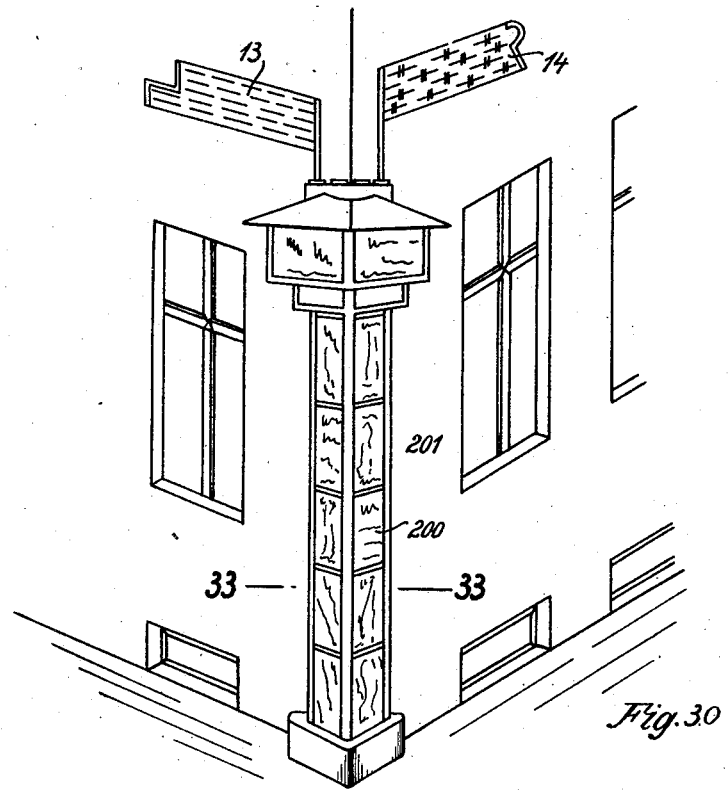

Fig. 30 a traffic regulating pillar embracing the corner of a house, and

Figure 31:
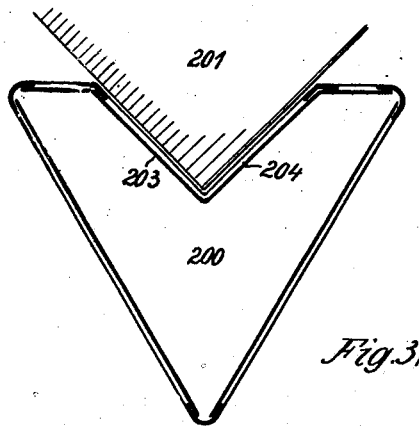

Fig. 31 a cross-section along line 33—33 of Fig. 30.

Figure 1:
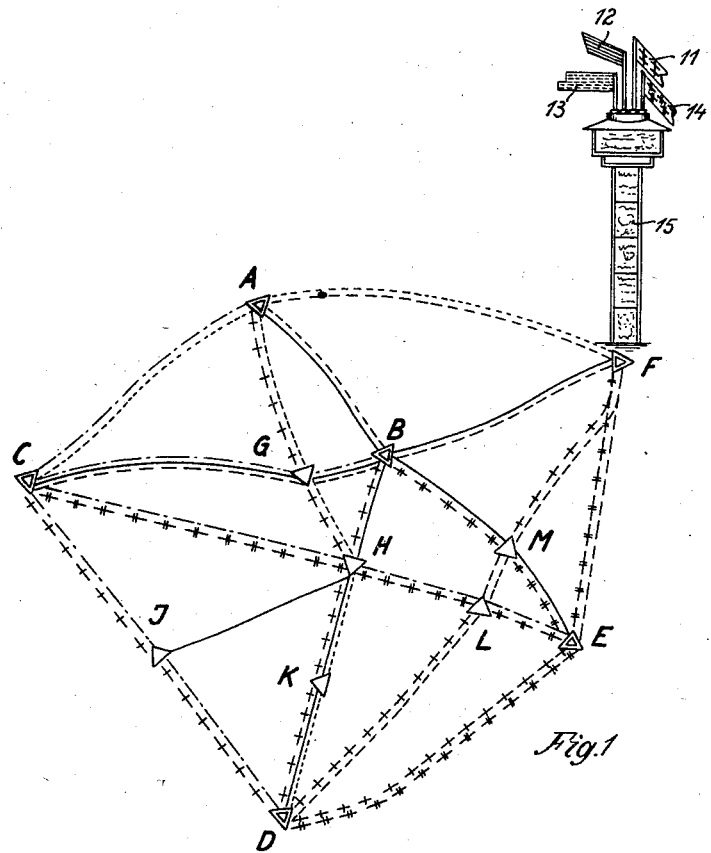
Figure 1 is a map diagram showing an adaptation of my invention.

Fig. 1 of the drawings shows diagrammatically a map to be used together with the finger posts according to the invention. Some traffic main points, road termini, such as large towns of a country are marked by double or concentric triangles and letters A, B, C, D, E, F. G, H, J, K, are, for instance, towns of less importance, which are marked by single triangles. The double or single triangles indicate, that traffic regulating pillars 15 are located in those towns, an example of which is shown at F.

Figure 2:
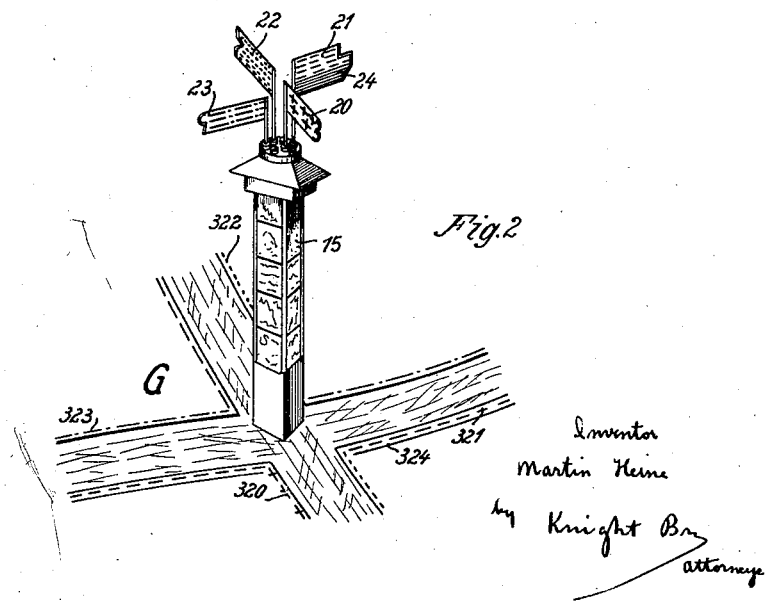
Figure 2 is a perspective view of one of my improved traffic-regulating signs represented on a greatly enlarged scale in respect to the highways.

Fig. 2 of the drawings shows a road crossing (G of Fig. 1) on an enlarged scale with its pillar 15.

According to the invention a like system of signs is apportioned to each road terminus for the roads leading to it, so that, for instance, the roads leading towards A are indicated by dotted lines, the roads leading towards B by full lines, the roads leading towards C with lines in dots and dashes, the roads leading towards D with singly crossed dashes, those leading towards E with doubly crossed dashes, while those leading towards F are indicated by dashed lines, so that on the map, as a rule, viewed in the direction of travel, the marking sign located on the correct sides of the road, in Germany on the right hand side, will lead to this destination.

In correspondence therewith the finger post at F, for instance, shows with its sign board 13, which points in the direction of the traffic main point A, the sign of that direction, viz. points, while the pointer or vane 12, pointing towards B, shows the sign of that point, viz. full lines, while the pointer 11 in the direction towards the traffic main point D shows crosses, and the pointer 14 in the direction towards the traffic point E doubly crossed dashes. In like manner the pointers of the traffic pillar 15 of Fig. 2 show those signs which are decisive for the individual roads leading away from the traffic regulating pillar; so shows, for instance, the pointer 21 the indication 321 of the road leading towards the right in the drawings, the pointer 22 the sign 322 of the road leading backwards, the pointer 23 the sign 323 of the road leading towards the left, the pointer 20 the sign 320 of the road leading forwards, while the pointer 24 indicates that the road leading towards the right also shows the sign 324, and that consequently that road leads towards the traffic main point B as well as towards the traffic main point F.

If a motorist, for instance, looks for the roads leading towards the road terminus F, he has only to observe the dashed lines, which lead from any starting point towards F, while all the remaining signs may be immaterial for him. The direction of motion may be indicated on the map by arrows or by providing certain signs with arrow heads. If, however, the motorist travels on a road leading towards F away from F, for instance, from F to A, the former sign leading towards F is no longer decisive for him, but that sign which is apportioned to the road terminus A, viz. the dotted line.

It is generally sufficient if the road between two road termini, for instance B and F shows the two signs apportioned to the road termini B and F; if however, the road leads past a road terminus to another road terminus, it may also show the signs of that further road terminus, as shown by way of example on the road C—B, which in the direction towards C carries the sign apportioned to this traffic terminus, in the direction towards B the sign for the track terminus B, as well as the sign for the road terminus F, as the road leads past B to F.

If now the roads are provided with finger posts in such a manner, that the pointers, fingers or vanes of the road indicator carry the sign, which is apportioned to the road terminus located in the direction in which the finger points, the finger posts of all the roads leading to the respective road terminus all point towards this terminus. The pointers, fingers or vanes will then be provided with like signs, as shown on the map, so that a motorist, who knows the sign of the road terminus can first on the map arrive at a decision about the road to be followed and then follow it without referring to any map, since the like sign, the direction of which is also shown on the finger posts, leads with certainty towards one and the same track terminus. If the road leads in the same direction towards a plurality of road termini, there is no reason, why the arms or pointers should not be correspondingly designed.

According to the invention certain colors of the finger posts and in correspondence therewith on the map may thus be apportioned to the cities of a country or several neighbouring countries, as for instance the continent of Europe, thus Berlin, Hamburg, Brussels, Amsterdam, Paris, Madrid, Berne, Rome, Prague, Vienna, Budapest, Belgrade, if desired also the connecting roads separated by the sea to London, Copenhagen, Stockholm and so on, so that for instance all roads leading to Berlin are marked red, those leading to Paris green, those leading to Berne yellow and so on. A road from Berlin to Paris would thus in the direction towards Paris be marked green and in the direction from Paris to Berlin red.

The road indicators or finger posts might carry indications about the main traffic points and also about places in the vicinity with the distances between them. Not only certain colors might be apportioned to the road termini, but beyond this the certainty of the road indications might be considerably increased, if according to the further development of the invention uniformly a plurality of signs of different systems are apportioned to the road termini. The colors might, for instance, cooperate with certain forms in space or cubic shapes, or color combinations or geometrical figures could be employed together with colors or cubic shapes. This is indicated in Figs. 3 to 21 of the drawings. The pointers, arms or fingers show differently shaped ends, or also recesses and the like. By the different shading or marking of the surface it is intended to indicate, that a different color or color combination corresponds with each shape of the pointer. Pointers of a certain outer shape may also be combined with recesses of different shape, as shown by way of example in the Figs. 11 and 12 of the drawings, so that a large number of different cubic shapes may be apportioned to a large number of colors.

By the arrangement according to the invention the great advantage is attained, that the reliability of the readings is increased to a high extent, since in case of weakened visibility of the signs by climatic conditions, such as fog, twilight, darkness, or physiological or psychological conditions, such as color blindness the discernibility of at least the sign of one nature remains with great certainty due to the combination of signs of a different nature. The signs of definite cubic shape may thus, for instance, be ascertained in absolute darkness by touch, so that a special illumination of the finger posts or road indicators is unnecessary, although the direction indicators might naturally be illuminated or be provided with illuminating points. If on the indicator posts colors of different color values are employed as distinguishable sign systems, strongly contrasting colors may be used, by providing the sign board or special signs upon the sign board with one color, the inscription or the ground of the board with the contrasting other color. As psycho-technically strongly contrasting colors have been ascertained light red and green, blue-green and light violet, chrome yellow and light violet, orange and dark grey, white and dark green, grey and dark blue. As contrasting color values such of strongly differing illuminating power may also be used, so that an effect of highest illuminating power results. Strong differences of shades between background and the inscription or the signs applied to the background are preferably chosen, if desired within the same color or also in different colors, the shades being for instance determined contrasting according to the color scale.

The visibility and perceptibility of the sign may, furthermore, be considerably increased, if the ends of the pointers, arms or vanes are cut out or cut off at the ends in the manner shown, for instance, at 30 in the Figs. 14 to 21 that they represent a shape at the end, which is a characteristic constituent of a letter essential for the pointer indications, for instance inscription or color. In the end of the pointer shown in Fig. 19 or the pointer 23 of Fig. 2 for instance, it is obvious, that the letter R is essential for the pointer, in the German language, for instance the initial letter of the color rot, in the English language red, or in French rouge. For the pointer in Fig. 20 the letter Z is essential, for that in Fig. 21 the letter O, for that in Fig. 17 or the pointer 20 of Fig. 2 the letter B and for that in Fig. 18 the letter G and so on. In order to make the outline of the letter visible at night also, it may be carried out in self-illuminating enamel or the like, or the contour may be provided with a striking light reflecting surface, as indicated by the double line 30 at the pointer ends according to Figs. 14 to 21 and also Figs. 2, 26 and 30. The arrangement according to the invention in which like signs are apportioned to the main traffic places or road termini in the directions of the roads leading towards them may be further developed by creating curves passing around towns or points of strong traffic, which for each separate direction of travel are each provided with like signs. In correspondence therewith such by-pass curves or traffic rings are provided on maps as well as on roads which are suitable to serve as by-pass roads for towns, centers of traffic and so on, in the form of finger posts marked with the indication of the traffic ring including its direction of travel. These roads may on the card as well as on the finger posts erected along the roads, as described before, carry the indications which are apportioned to those road termini towards which the roads lead. It is, however, equally well possible to employ special systems of signs, as described below with reference to Fig. 22 of the drawings.

Referring to this figure $a$ is the traffic center or a town around which by-pass rings are arranged. In the example illustrated two by-pass rings 45, 46 are shown. Both rings show two systems of signs according to the direction of travel, one, the inner one for the time being, indicated by double dots and double dashes being traversed clockwise and serving as departure ring, while the other system of signs, indicated by dashes and circles is traversed counter-clockwise, and serves as arrival ring.

If a motorist is at the point $i$ and desires to reach the road terminus A indicated by dotted line, he will be able to gather from the finger post entered at the point $i$ the distances to the various road termini, as well as the signs apportioned to those termini. He is able to inform himself that if he travels on the ring in the direction of arrival he can reach A without touching the interior of the town. At the same time he can learn on the finger post for the departure ring, that the distance to A in the direction of the departure ring is greater. If, however, he wishes to reach E, he will travel in the direction of departure on the by-pass ring, since in this direction the road to E is the shorter. Besides the distance in km. from the point $i$ to A, the departure possibilities from the ring to A, the motorist is also able to ascertain at the pillar, that if he chooses in the direction of the departure ring the longer road, he has to leave the ring at the fifth pillar and that he will find there the direction of the arrow desired by him, while, if he decides to choose the shorter arrival ring he has to leave the ring already at the second pillar. He has only to remember the number of the pillars, which he has to pass.

If he intends to travel to the road terminus C he is again able to inform himself from the statements on the pillar, whether he travels on the outer or inner ring or whether he will travel through the town and he is also able to learn from the indications, how he can reach the interior of the town $a$. The finger posts contain also the name of the place, in the case of larger towns also the name of the respective suburb or other informations useful for the motorist. In order to increase in traffic regulating pillars, finger posts and the like, which carry a plurality of direction pointers or vanes, the clearness of the arrangement of the pointers branching off the main road or of the pointers located behind one another in the line of vision, the pointers mounted on a common pillar or post of traffic regulating columns, road indicators, finger posts and the like are arranged with their ends facing the support at some distance from the support or its axis and above the support, in such a manner, that the space above the support and between the ends of the pointers permits an unrestricted view. It is thus possible in a finger post, which, for instance, carries two pointers arranged in the direction of travel and opposite this direction, to ascertain even at the high speed of travel, as common in automotive vehicles at a glance, that behind these pointers there are located other pointers deviating in direction.

Some embodiments of this feature of the invention are illustrated in Figs. 23 to 29 of the drawings.

The Figures 23 to 29 of the drawings illustrate further preferred constructions, which permit the traffic regulating pillars as well as the indicator signs and the arms carrying them to be produced in mass manufacture and by the like organization and to reduce the erection work at the site of the finger post or the traffic regulating pillar to a minimum, but which at the same time ensure a safe attachment of the signs as well as the arms supporting them and which render tampering extremely difficult.

According to another feature of the invention, the posts carrying the pointer signs and preferably designed as section girders are adapted to be individually turned around their longitudinal axes and to be adjusted vertically. More specifically horizontal discs, rims or spiders and the like are provided through which extend the posts carrying the pointers and which carry the adjusting devices and means of attachment of the posts.

In Fig. 23 of the drawings is illustrated a traffic regulating pillar, which carries a plurality of carrier posts 120 of profiled iron, upon which are mounted the pointers, as shown in Fig. 26, so that, for the instance, U-irons serve as arms, in the troughs of which the sign plates are mounted.

In this example of construction two horizontal discs or plates 125, 126 are arranged at a distance from one another, which are, for instance, provided with round openings 127, 128 through which project the posts constructed of U-iron carrying the sign plates. The posts 120 are adapted to be turned around their longitudinal axis and to be vertically adjusted upon these horizontally arranged plates 125, 126. For the adjustment of the direction of the pointers in space or the orientation of the posts carrying the pointer plates serve the openings 127 or 128 or the rotatable discs 130 overlapping the two openings. These discs are adapted to be mounted on the posts or they are provided with recesses 134 adapted to the cross-section of the girder 133, which are adapted to be turned with the posts, but may as regards their orientation be locked with the plates supporting them.

In this modification the discs, which ensure the orientation of the posts, are on their circumference provided with teeth 137, which engage stops 138 fixed on the underside of the plate 125 for instance. The rotatable discs projecting through the passage openings of the posts may equally well be arranged at the top of the horizontal plates and they might be adapted to be turned on the upper or lower plate or in both plates simultaneously. By this arrangement it is easily possible to provide first the posts in the factory with pointer plates, to introduce them at the site into the openings of the horizontal discs, and to align the pointer plates by turning them round and introducing the teeth into the stop pin. It is therefore easily possible to mount a large number of pointer plates within a few minutes and to bring them into the correct position. In order to render the mutual overlapping of the pointer plates impossible, the posts carrying the pointers are according to another feature of the invention also adjustable in a vertical direction, so that the pointer plates may also be adjusted in this direction, as desired. The attachment and locking means for the vertical adjustment of the posts 120 may likewise be provided on one or both plates 125, 126. The web or the two flanges of the section iron may be provided with openings 140, 141, through which, for instance, a hooked bolt 142 may penetrate resting upon a plate, for instance 126. According to the height of the proposed pointer plate the bolt is introduced into one of those openings 140 or 141 and lowered on to the adjacent plate. This confines the motion of the posts in a downward direction, while the motion upwards is confined by the hook-shaped extension 143 projecting over the edge of the disc. It will be readily understood, that the bolt or hook may be substituted by a suitable key construction or by any other appropriate attachment device.

A further preferred design for securing the girders 120 in their vertical position is illustrated in the Figs. 26 to 29 inclusive of the drawings. Here pins 172 preferably provided with points, serve for locking the girders, and are guided in bushings 173 which in their turn are mounted on the plates 125 or are made in one piece with them. These pins engage recesses 176, which for instance, are forced into the arms carrying the pointers by means of a suitable tool or are arranged in any other appropriate manner.

By using a plurality of plates 125, 126 the posts 120 may likewise be aligned vertically. This alignment may, for example, be effected, as likewise shown in Fig. 25, by one of the plates, for instance the upper cover plate 125 having tubular extensions 146 through which penetrate the posts 120. The two ends of these extensions are covered or closed by rotatable discs 130 or 148. These discs serve to ensure the orientation of the posts and, if desired, the elevation of the position of the posts. They are provided with recesses 133 adapted to the cross-section of the girder, as described before. Both discs may be detachable by, for instance, being adapted to be pressed against each other and against the two ends of the tubular extension by a tensioning bolt 150. If a twisting of the post after introduction into the passage openings of the discs or the like is not required, the upper cover 148 may also be made integral with the disc, by, for instance, pressing the tubular extension out of the disc and punching into the wall 148 of this extension the opening for the projecting arm 120 in a single operation.

The disc 125 preferably serving as upper cover plate of the traffic regulating pillar is arched outwards to facilitate the escape of rain water. To prevent tampering the two plates may be enclosed by a housing 155, which may be adapted for the reception of advertising signs. These two plates may, as shown, in Fig. 23, be carried by a central pillar 156 which within the housing which may extend downwards to the ground, is effectively protected against atmospheric influences and against being soiled by animals and the like, so that a long life results even when no particularly high-grade paint is used for coating the housing. The housing 155 surrounding the pillar may consist of lattice work, such as 156, 157, 158 the rods of which preferably have concave edges 159 for the reception of the edges of advertising signs. In this way it is possible to reduce the strains developing at the edges of enamel signs liable to endanger the life of the enamel.

It will be understood that while I have described a preferred embodiment of my invention, other supporting structures may be employed without departing from the broad underlying principle of my invention.

A further design of a finger post for the reception of advertising signs is illustrated in Figs. 26 to 29 of the drawings. The pillar consists here of a frame structure, which comprises vertical corner uprights 195 forming a triangular pillar or housing and suitable transverse stays or girders 190. In the head 180 of the pillar there are provided the two bearer plates 160, 165. The plate 160 forms at the same time the upper confining plate of the pillar. It is provided with suitable recesses for the passage of the pointer posts. The passage openings are closed and stiffened by appropriate means such as flanges 161. For discharging rain water the roof is carried downwards in suitable shape as shown at 168. The lower bearer plate is secured in place by means of stays 166, 167 provided in the corners of the pillar. It carries discs 125, described before, serving for the orientation of the pointer arms and provided with teeth 137, into the gaps of which enter interlocking means, such as the bolts 138.

These figures illustrate at the same time a further modification of the design, which enables the side walls of the pillar to be provided with advertising signs, the attachment of these plates being effected without the aid of any screwing device. For this purpose the corner stays 195 of the framework housing are provided with inwardly directed angle irons 193, 194, which are engaged by the vertical edges of the advertising signs, as shown in cross-section in Fig. 27, and in elevation in Fig. 28. The horizontal edges of the advertising signs abut against the angle irons 190 of the transverse girders and may be provided with extensions 198, which prevent rain and dampness from entering the interior of the housing. The signs may consist of any suitable material, such as sheets of any desired metal coated with paint or enamel, but it will be understood that glass sign plates may equally well be employed. To lock these advertising signs in position the flanges 113 of the angle irons 193, 194 extending into the interior of the pillar are provided with recesses 196, which are preferably arranged at the top and extend obliquely downwards and towards the front. These recesses are located behind the advertising signs 191 and are adapted in pairs to receive locking bolts 192, Figs. 28 and 29, provided with heads 197, for instance.

Inasmuch as these flanges 193 are located at both sides of the advertising signs and the recesses at both sides extend obliquely towards the plate the bolts 192 act like wedges upon the sign plates and are therefore extraordinarily firmly held in place. On the other hand they may easily be raised and removed from the slots, so that the sign is now entirely free to be removed. Preferably two or more signs located above one another on one side of the pillar may be formed as doors, so that the interior of the pillar becomes comfortably accessible. The advertising sign plates may then be placed in position or exchanged in a few minutes by entirely unskilled personnel and the interlocking means of the signs are quite inaccessible from the outside, while it is absolutely reliable from the interior and at the same time so, that unfavorable strains upon the sign plates are entirely avoided. Although the pillars are mounted in public main roads advertising signs sensitive to strains, such as enamel and glass signs, may be employed without hesitation.

The angle irons 193, 194, which with their flanges face the interior of the housing are preferably made integral with the corner stags 195, as shown in cross-section in Fig. 27. This results in an extraordinary inexpensive construction. All the other portions of the pillar may likewise be produced cheaply in mass manufacture and by employing standardized constituents. The erection is extremely simple and may be effected at site in a very short time even by unskilled personnel. The pillars are preferably made of triangular cross-section, but, may of course, have any other suitable cross-section. They may be erected at road crossings, public places, or any other points. The sign fingers, vanes according to this invention need not be arranged at separate pillars or the like, so the usual boards or signs or plates at the front of the houses or the finger posts at the corners of the streets which design the names of the streets, houses and the like, may at the same time by their color, form or the like design that or those road main termini they are apportioned to. In towns with narrow streets, in which the erection in the streets or on the footpath is not desirable, the pillars may be attached to corners of houses, buildings, walls and the like, by providing for instance, the pillar, with a longitudinal recess extending from top to bottom, into which the corner of the building or wall may enter. Such a design is illustrated in Figures 30 and 31 of the drawings.

The pillar is provided with advertising signs, 200 and, for example, two finger posts 13, 14. The housing of the pillar is provided with a notch or dent or inwards extending angle 203, 204, into which extends the corner 201 of a building or the like.

Various changes and modifications may be made without departing from the spirit of my invention and I desire therefore, that the appended claims should be construed in the light of prior knowledge.

I claim:—

1. In a traffic regulating device, the combination of a central pillar, at least one horizontal plate mounted on said pillar, said horizontal plate being provided with openings arranged around and at a distance from the axis of said plate, pointers provided with rods adapted to be inserted into said openings, means for attaching said rods and adjusting them with respect to said horizontal plate, and a housing for said pillar and plate, said housing including a framework and show-boards forming closed panels in the side walls of said housing.

2. In an arrangement for traffic regulating indicators in combination, pointers, posts for carrying said pointers, a common support for carrying said posts and fixing them thereon, said posts being arranged all around and at a distance from the axis of said support in such a manner, that the space above the support and between the post presents an unrestricted view.

3. In an arrangement for traffic regulating indicators in combination, pointers, posts for carrying said pointers, a common support for carrying said posts and fixing them thereon, said posts being arranged all around and at a distance from the axis of said support and adapted to be rotated each per se around their longitudinal axes and to be adjusted vertically.

4. In an arrangement for traffic regulating indicators in combination, pointers, posts for carrying said pointers, a common support for carrying said posts and fixing them thereon, said posts being arranged all around and at a distance from the axis of said support and carried out as profile girders and being adapted to be rotated each per se around their longitudinal axes and to be adjusted vertically.

5. In an arrangement for traffic regulating indicators, in combination pointers, posts for carrying said pointers, a common support for carrying said posts, a plate horizontally arranged at said support and being provided with openings, arranged around and at a distance from the axis of said support, said posts penetrating said openings, attaching means and adjusting means arranged at said plate and adapted to adjust and to fix said posts.

6. In an arrangement for traffic regulating indicators, in combination pointers, posts for carrying said pointers, a common support for carrying said posts, two plates horizontally arranged at said support and being provided with openings, said posts penetrating said openings, said plates being adapted to align said posts, and attaching means and adjusting means arranged at least one of said plates and adapted to adjust and to fix said posts.

7. In an arrangement for traffic regulating indicators, in combination pointers, posts for carrying said pointers, a common support for carrying said posts, a plate horizontally arranged at said support and being provided with openings, said posts penetrating said openings, rotatable discs overlapping said openings said rotatable discs being provided with recesses adapted to the cross-section of said posts, attaching means and adjusting means arranged at said rotatable discs and adapted to adjust and to fix said posts.

8. In an arrangement for traffic regulating indicators, in combination pointers, posts for carrying said pointers, a common support for carrying said posts, a plate horizontally arranged at said support and being provided with openings, said posts penetrating said openings, rotatable discs overlapping said openings, said rotatable discs being provided with recesses adapted to the cross section of said posts, attaching means and adjusting means arranged at said rotatable discs and adapted to adjust and to fix said posts and locking means at said discs adapted to lock said rotatable discs to said plate.

9. In an arrangement for traffic regulating pillars, in combination pointers, posts for carrying said pointers, a common support for carrying said posts, at least one plate horizontally arranged at said support, openings within said plate, rotatable discs overlapping said openings and being provided with recesses adapted to the cross section of said posts, said rotatable discs being provided with locking means adapted to fix the posts at definite height and with adjusting means adapted to adjust the posts at definite orientations, and locking means adapted to lock said rotatable discs at said plates.

10. In an arrangement for traffic regulating pillars, in combination pointers, posts for carrying said pointers, a common support for carrying said posts, at least one plate horizontally arranged at said support, openings within said plate, rotatable discs overlapping said openings and being provided with recesses adapted to the cross section of said posts, pointed pins being arranged at said rotatable discs and corresponding recesses at the posts, said pointed pins and corresponding recesses being adapted to fix the posts at definite height, said rotatable discs being provided too with adjusting means adapted to adjust the posts at definite orientations, and locking means adapted to lock said rotatable discs at said plates.

11. In an arrangement for traffic regulating pillars, in combination pointers, posts for carrying said pointers, a common support for carrying said posts, at least one plate horizontally arranged at said support openings within said plate, rotatable discs overlapping said openings and being provided with recesses adapted to the cross section of said posts, pointed pins being arranged at said rotatable discs and corresponding recesses at the posts, bushings mounted on said rotatable discs and adapted to guide said pins, said pointed pins and said corresponding recesses being adapted to fix the posts at a definite height, said rotatable discs being provided too with adjusting means adapted to adjust the posts at definite orientations, and locking means adapted to lock said rotatable discs at said plates.

12. In an arrangement for traffic regulating pillars, in combination pointers, posts for carrying said pointers, a common support for carrying said posts, at least one plate horizontally arranged at said support, openings within said plate, rotatable discs overlapping said openings and being provided with recesses adapted to the cross section of said posts, said rotatable discs being provided with teeth like indentures, stops arranged at said plate and adapted to enter the teeth like indentures of said rotatable discs, said indentures and said stops being adapted to orientate said rotatable discs and said posts penetrating them.

13. In an arrangement for traffic regulating indicators, in combination a central pillar, at least one plate horizontally arranged at said pillar, pointers, posts for carrying said pointers, said plate being provided with openings arranged around and at a distance from the axis of said plate, said posts being adapted to penetrate said openings, attaching means and adjusting means arranged at said plate adapted to fix and adjust said posts.

14. In an arrangement for traffic regulating indicators, in combination a central pillar, at least one plate horizontally arranged at said pillar, pointers, posts for carrying said pointers, said plate being provided with openings arranged around and at a distance from the axis of said plate, said posts being adapted to penetrate said openings, attaching means and adjusting means arranged at said plate adapted to fix and adjust said posts, a frame-work housing enclosing said pillar and said plate.

In testimony whereof I affix my signature.

MARTIN HEINE.